United States Patent [19]

Wamprecht et al.

[11] Patent Number: 5,733,973
[45] Date of Patent: Mar. 31, 1998

[54] HIGH SOLIDS BINDER COMPOSITIONS CONTAINING OH-FUNCTIONAL POLYACRYLATE GRAFT COPOLYMERS

[75] Inventors: Christian Wamprecht, Neuss; Michael Sonntag, Odenthal; Jürgen Schwindt, Leverkusen; Dieter Margotte, Krefeld, all of Germany

[73] Assignee: Bayer Aktiengesellschaft, Leverkusen, Germany

[21] Appl. No.: 755,878

[22] Filed: Dec. 2, 1996

[30] Foreign Application Priority Data

Dec. 7, 1995 [DE] Germany .......... 195 45 634.3

[51] Int. Cl.⁶ .................................................. C08G 63/48
[52] U.S. Cl. .................. 525/68; 525/77; 525/78; 525/92 B; 525/124; 525/132
[58] Field of Search ......................... 525/77, 78, 68, 525/92 B, 124, 132

[56] References Cited

U.S. PATENT DOCUMENTS

| | | | |
|---|---|---|---|
| 4,145,513 | 3/1979 | Dalibor | 528/75 |
| 4,276,210 | 6/1981 | Höhlein et al. | 260/29.4 UA |
| 4,743,643 | 5/1988 | Buter | 524/396 |
| 4,758,642 | 7/1988 | Yezrielev et al. | 526/213 |
| 4,837,273 | 6/1989 | Wamprecht et al. | 525/66 |
| 4,855,369 | 8/1989 | Yezrielev et al. | 526/320 |
| 4,985,517 | 1/1991 | Yezrielev et al. | 526/208 |
| 5,034,154 | 7/1991 | Yezrielev et al. | 252/364 |
| 5,455,306 | 10/1995 | Mori et al. | 525/303 |

FOREIGN PATENT DOCUMENTS

| | | |
|---|---|---|
| 1307612 | 9/1992 | Canada . |
| 2128657 | 2/1995 | Canada . |
| 68132 | 1/1983 | European Pat. Off. . |
| 244996 | 11/1987 | European Pat. Off. . |
| 275011 | 7/1988 | European Pat. Off. . |
| 398387 | 11/1990 | European Pat. Off. . |
| 408858 | 1/1991 | European Pat. Off. . |
| 2064566 | 6/1981 | United Kingdom . |

*Primary Examiner*—Melvyn I. Marquis
*Attorney, Agent, or Firm*—Joseph C. Gil; Thomas W. Roy

[57] ABSTRACT

The present invention relates to binder compositions containing

A) 40 to 95 parts by weight of OH-functional graft copolymer resins which are prepared by copolymerizing a mixture containing 0.1 to 10 parts by weight of at least one optionally functional polybutadiene having a molecular weight of 500 to 10,000 and having at least 20% by weight of side-chain 1,2-vinyl double bonds, and B) 5 to 60 parts by weight of a polyfunctional cross-linking resin selected from aminoplast resins and optionally blocked polyisocyanates, wherein the sum of the parts by weight of components A) and B) add up to 100, based on the weight of components A) and B).

The present invention also relates to the use of the binder compositions according to the invention for lacquering vehicles, wood and furniture, and for preventing corrosion.

13 Claims, No Drawings

HIGH SOLIDS BINDER COMPOSITIONS CONTAINING OH-FUNCTIONAL POLYACRYLATE GRAFT COPOLYMERS

BACKGROUND OF THE INVENTION

1. Field of the Invention

The present invention relates to novel OH-functional polyacrylate-based binder components, a method for producing them and their use for production of coatings that rapidly dry both physically and chemically.

2. Description of the Prior Art

High solids polyacrylate resins have the advantage of reducing the emission of organic compounds, mainly solvents, when the lacquer is applied. In order to obtain these high solids lacquer formulations, it is necessary to use suitable polyacrylate resins having a low viscosity, i.e. low molecular weight.

It is known that low-viscosity polymers can be obtained by radical polymerization in solution (e.g. EP-A 408,858, EP-A 398,387 and U.S. Pat. No. 4,145,513). One disadvantage is that the properties of the polymers are impaired by the use of considerable quantities of polymerization modifiers and by the substances which result. Thiols, in particular, used as polymerization modifiers, may smell unpleasantly or even be poisonous. Consequently in EP-A 225,808 and EP-A 225,809, the modifiers used are α-olefins such as 1-octene or 1-decene, which do not have an unpleasant smell. However, two-component polyurethane coating compositions based on polyacrylate resins according to EP-A 225,809, aliphatic lacquer polyisocyanates, physically dry too slowly for use in car repair and large-vehicle coating.

EP-A 635,523 and EP-A 638,591 describe high solids polyacrylate resins produced by polymerization in the absence of solvent and then thinned with a suitable solvent. It is known that when polymerization is carried out in solution that high solids polyacrylate resins having a narrowly distributed, unimodal molecular weight distribution can be produced by using peroxides containing tert.-amyl groups. EP-A 635,523 discloses achieving the same type of molecular weight distribution when producing polyacrylates in the absence of solvents. It has been shown that peroxides carrying tert.-amyl groups result in lower-viscosity polyacrylate resins than peroxides containing tert.-butyl groups. However, polymerization in the absence of solvents does not have any clear advantages over solvent polymerization. The polyacrylate resins obtained at a solids content of 70% by weight have a viscosity at 23° C. of between 2790 and 9130 MPas. These viscosities are in the medium solids range and, therefore, do not meet present-day requirements for high solids coating compositions.

EP-A 638,591 describes high solids copolymers which have relatively low viscosity due to use of (meth)acrylate monomers with sterically hindered (cyclo)alkyl radicals. When these copolymers are produced by polymerization in the absence of solvents, all the examples exemplify mono-epoxide (Cardura E 10 resin) as the reaction medium. During polymerization, this mono-epoxide reacts with the metered (meth)acrylic acid and is thus incorporated into the polyacrylate. The reaction results in products mainly having secondary hydroxyl groups which, in addition to the primary or secondary hydroxyl groups introduced by hydroxy-functional monomers, e.g, hydroxy-ethyl methacrylate or hydroxypropyl methacrylate, respectively, are available for reaction with the polyisocyanate used as the cross-linking agent.

The secondary hydroxyl groups are much less reactive towards polyisocyanates than the primary hydroxyl groups. Consequently two-component polyurethane coating compositions based on polyacrylate resins with mainly secondary hydroxyl groups take many days to achieve adequate cross-linking density and, consequently, satisfactory stability in solvents. However, in car repair and large-vehicle lacquering, rapid chemical cross-linking is necessary in addition to rapid physical drying, if the vehicle is to be quickly returned to the road.

An object of the present invention is to prepare novel hydroxy-functional copolymers by solution polymerization, which, in combination with (cyclo)aliphatic lacquer polyisocyanates, yield high solids coating compositions which quickly dry physically and quickly cross-link chemically. In contrast to coatings prepared from known coating compositions, it is an additional object of the present invention for the novel high solids coating compositions to yield high quality coatings which, after hardening for only a few days, have adequate stability against solvents solids and consequently enable the vehicle to be quickly re-used.

These objects can be achieved with the high solids coating compositions according to the present invention, which are based on binder compositions containing special high solids graft copolymers and polyisocyanates. These coating compositions yield coatings which dry physically and are chemically cross-linked very quickly at room temperature (23° C.), i.e., they have excellent resistance to solvents after only 1 to 2 days. Due to their excellent overall properties, such as hardness, elasticity, and resistance to chemicals and weather, the resulting coatings can be used on vehicles, preferably in car repair and large-vehicle lacquering. Other applications include the prevention of corrosion or the coating of wood and furniture.

SUMMARY OF THE INVENTION

The present invention relates to binder compositions containing 40 to 95 parts by weight of OH-functional graft copolymer resins which are prepared by copolymerizing a) 0.1 to 10 parts by weight of at least one optionally (OH or COOH) functional polybutadiene having a number average molecular weight of 500 to 10,000 and having at least 20% by weight of side-chain 1,2-vinyl double bonds, b) 5 to 30 parts by weight of at least one aliphatic α-olefin having 8 to 16 carbon atoms, c) 10 to 70 parts by weight of at least one unsaturated aromatic monomer, d) 5 to 60 parts by weight of at least one hydroxyalkyl ester of (meth)acrylic acid having 2 to 4 carbon atoms in the hydroxyalkyl radical and a primary hydroxyl group, e) 0 to 50 parts by weight of at least one (cyclo)aliphatic ester of acrylic and/or methacrylic acid having 1 to 12 carbon atoms in the alcohol component, f) 0.1 to 10 parts by weight of at least one α,β-mono-olefinically unsaturated mono- or dicarboxylic acid having 3 to 7 carbon atoms and/or at least one maleic acid or fumaric acid semiester having 1 to 14 carbon atoms in the alcohol radical, g) 0 to 30 parts by weight of other copolymerizable olefinically unsaturated compounds and B) 5 to 60 parts by weight of a polyfunctional cross-linking resin selected from aminoplast resins, urea resins, guanidine resins, phenolic resins, resols and optionally blocked polyisocyanates, wherein the sum of the parts by weight of components A) and B) add up to 100, based on the weight of components A) and B), and the sum of the parts by weight of components a) to g) add up to 100.

The present invention also relates to the use of the binder compositions according to the invention for lacquering vehicles, wood and furniture, and for preventing corrosion.

BACKGROUND OF THE INVENTION

The binder compositions according to the invention contain 40 to 95 parts by weight, preferably 50 to 90 parts by weight, of component A) and 5 to 60 parts by weight, preferably 10 to 50 parts by weight, of component B) a polyfunctional cross-linking resin, wherein the sum of the parts by weight of components A) and B) add up to 100. Component B) is selected from aminoplast resins (such as alkoxylated melamine resins, melamine-formaldehyde condensation products), urea resins, guanidine resins, phenolic resins, resols and preferably optionally blocked polyfunctional isocyanates, more preferably oligomeric isocyanates having biuret, allophanate, uretdione, urethane and/or isocyanurate groups. The binder compositions are used for lacquering vehicles (preferably for car-repair and large-vehicle lacquering), lacquering of wood and furniture, and for preventing corrosion.

Graft copolymers A) differ fundamentally in chemical composition both from the polyacrylate polyols described in EP-A 225,809 and from the copolymers described in EP-A 635,523 and EP-A 638,591. With regard to the coating properties, particularly the speed of drying and the stability in solvents, there are advantages over the substances described in the cited documents, as will be shown in comparison examples.

Graft copolymer resins A) can be produced by copolymerizing components a) to g) by known methods. The preferred method is radical polymerization in solution, in which monomeric and oligomeric components are copolymerized at temperatures of 140° to 240° C. in the presence of radical initiators.

Preferred OH-functional graft copolymer resins are those which prepared by copolymerizing a) 0.3 to 7.5 parts by weight of one or more optionally (OH or COOH) functional polybutadienes having a number average molecular weight of 500 to 5000 and having at least 30% by weight of side-chain 1,2-vinyl double bonds, b) 5 to 25 parts by weight of at least one α-olefin having 8 to 12 carbon atoms, c) 15 to 65 parts by weight of at least one unsaturated aromatic monomer, such as styrene, α-methyl styrene or vinyl toluene, preferably styrene, d) 7.5 to 55 parts by weight of hydroxyethyl acrylate, hydroxyethyl methacrylate, butanediol-1,4-monoacrylate and mixtures thereof, e) 0 to 45 parts by weight of at least one (cyclo)aliphatic ester of acrylic and/or methacrylic acid having 1 to 10 carbon atoms in the (cyclo)alkyl component, f) 0.3 to 8 parts by weight of acrylic acid, methacrylic acid, maleic acid or fumaric acid semiesters having 1 to 8 carbon atoms in the alcohol component or mixtures thereof and g) 1 to 25 parts by weight of acrylonitrile, methacrylonitrile, hydroxypropyl(meth)acrylate (up to 10% by weight), vinyl esters of aliphatic, optionally branched monocarboxylic acids having 1 to 10 carbon atoms in the acid radical, di(cyclo)alkyl esters of maleic and/or fumaric acid having 1 to 8 carbon atoms in the alcohol radical, and mixtures thereof, wherein the sum of the parts by weight of components a) to g) add up to 100.

More preferred OH-functional graft copolymer resins are those which prepared by copolymerizing a) 0.5 to 5 parts by weight of one or more optionally (OH or COOH) functional polybutadienes having a number average molecular weight of 500 to 3000 and having at least 40% by weight of side-chain 1,2-vinyl double bonds, b) 5 to 20 parts by weight of 1-octene, 1-decene or mixtures thereof, c) 20 to 65 parts by weight of styrene, d) 10 to 50 parts by weight of hydroxyethyl acrylate, hydroxyethyl methacrylate and mixtures thereof, e) 0 to 35 parts by weight of ethyl acrylate, butyl acrylate, 2-ethyl hexyl acrylate, isobornyl acrylate, methyl methacrylate, ethyl methacrylate, butyl methacrylate, 2-ethyl hexyl methacrylate, cyclohexyl methacrylate, isobornyl methacrylate or mixtures thereof, f) 0.5 to 5 parts by weight of acrylic acid, methacrylic acid and mixtures thereof and g) 3 to 20 parts by weight of vinyl esters of aliphatic, optionally branched monocarboxylic acids having 3 to 9 carbon atoms in the acid radical, di(cyclo)-alkyl esters of maleic or fumaric acid having 1 to 8 carbon atoms in the alcohol radical and mixtures thereof, wherein the sum of the parts by weight of components a) to g) add up to 100.

The starting materials a) for graft copolymers A) are selected from polybutadienes containing at least 20%, preferably at least 30% and more preferably at least 40% by weight of side-chain 1,2-vinyl double bonds. Preferred are polybutadienes containing ≧30% vinyl double bonds. The remaining double bonds can have 1,4-cis and 1,4-trans structure in any desired proportions. Polybutadienes containing double bonds in cyclic structures are also suitable as component a). A product having ≧40% of 1,2-vinyl double bonds is a particularly suitable starting material.

Preferably, isomer mixtures of polybutadienes will be used, e.g., containing 30 to 90% of 1,2-vinyl double bonds, 10 to 70% mixtures of 1,4-cis and 1,4-trans double bonds and 0 to 30% cyclic components. The polybutadienes can optionally have functional groups, such as hydroxyl groups or carboxyl groups. The polybutadienes isomers mixtures are known, e.g., from "Makromoleküle" by H. G. Elias, 4th edition, Hüthig and Wepf-Verlag, Basle, Heidelberg, New York, pages 676, 744 to 746 and 1012 ff.

Graft copolymer A) usually contains monomers or oligomers a) to g) in the same proportions in which they are used for polymerization. The incorporated units are distributed substantially statistically. Component b) need not be completely incorporated in the graft copolymer and can be present as a residual monomer in the graft copolymer when dissolved. It will then either remain as an additional solvent in the product or can be removed with the solvent by distillation.

The solvents for manufacturing component A) include aliphatic, cycloaliphatic and/or aromatic hydrocarbons, such as alkyl benzenes, e.g, toluene and xylene; esters such as ethyl acetate, n-propyl acetate, isopropyl acetate, n-butyl acetate, acetates with longer alcohol radicals, butyl propionate, pentyl propionate, ethylene glycol monoethyl ether acetate and the corresponding methyl ether acetate;

ethers such as ethylene glycol acetate mono-methyl or -ethyl and -butyl ether; ketones such as methyl amyl ketone and methyl isobutyl ketone; glycols; alcohols; lactones and mixtures of these solvents.

Graft copolymers A) can be produced continuously or in batches. Usually the monomer mixture and the initiator are supplied uniformly and continuously to a polymerization reactor and simultaneously the corresponding quantity of polymer is continuously removed. Copolymers which are almost chemically uniform are preferably made by this method. Chemically almost uniform copolymers can also be made by supplying the monomer mixture and the initiator to the polymerization reactor at constant speed, without discharging the polymer.

Graft copolymerization is usually brought about at temperatures of 140° to 240° C., preferably 160° to 210° C., at a pressure of up to 25 bar. The initiators are used in proportions of 0.05 to 15% by weight, preferably 1 to 10% by weight, based on the total weight of components a) to g).

The initiators for producing the graft copolymers A) are known and include conventional azo or peroxide-based radical initiators, provided that they have a sufficiently long half-life for polymerization at the reaction temperature (about 5 seconds to about 120 minutes). Examples of suitable initiators include 2,2'-azo bis(2-methyl propane nitrile), 2,2'-azo bis(2-methyl butane nitrile), 1,1'-azo bis (cyclohexane carbonitrile), tert.-butyl peroxy-2-ethyl hexanoate, tert.-butyl peroxydiethyl acetate, tert.-butyl peroxyisobutyrate, 1,1-di-tert.-butyl peroxy-3,3,5-trimethyl cyclohexane, 1,1-di-tert.-butyl-peroxycyclohexane, tert.-butyl peroxy-3,5,5-trimethyl hexanoate, tert.-butylperoxyisopropyl carbonate, tert.-butyl peroxyacetate, tert.-butyl peroxybenzoate, dicumyl peroxide, tert.-butyl cumyl peroxide, di-tert.-butyl peroxide and di-tert.-amyl peroxide.

Graft copolymers A) are valuable binder components for high solids two-component coating compositions. In accordance with the present invention "two-component coating compositions" include both "one-pot systems" and "two-pot systems". Since the polymer resins according to the invention are binder components for two-component coating compositions, they are used with a hardener component (and optionally other polyhydroxyl compounds and/or amine reactive thinners). If the hardener is a polyisocyanate with free isocyanate groups, the coating composition is prepared shortly before use by mixing the components. In such cases the system is a "two-pot" system. If, however, the hardener is a compound which does not react with the polymer resins according to the invention except at elevated temperature, e.g., in the case of polyisocyanates having blocked isocyanate groups, the hardener can be combined with the polymer resin at room temperature to form a "one-pot" system which can be stored at room temperature.

In the use according to the invention graft copolymers A) may optionally mixed with other known organic polyhydroxyl compounds and/or with reactive thinners containing amine groups. Examples of these other polyhydroxyl compounds include the known polyester, polyether, polycarbonate, polyurethane and polyacrylate polyols. These other organic polyhydroxyl compounds are preferably polyacrylate polyols and/or polyester polyols. The reactive thinners can be compounds containing blocked amino groups, e.g. aldimines or ketimines, or compounds containing amino groups, which are not blocked, e.g., aspartic acid esters. Preferably, the reactive thinners have more than one (blocked) amino group, so that during the cross-linking reaction they help to build up the polymeric lacquer film network.

When used according to the invention, graft copolymers A) can be mixed with up to 70%, preferably up to 50% by weight of the previously described polyols and/or reactive diluents. More preferably, graft copolymers A) are the only polyol components used according to the invention.

The content of hydroxyl groups in graft copolymers A) is 0.53 to 8.76% by weight, preferably 0.88 to 8.03% by weight and more preferably 1.31 to 7.3% by weight.

Reaction component B), which is used in combination with hydroxyl-containing graft copolymer resins A) to prepare the binder compositions according to the invention, are cross-linking reagents that chemically react with the hydroxyl groups in the graft copolymer resins so as to cure the coatings according to the invention, include aminoplast resins, e.g., melamine derivatives such as alkoxylated melamine resins or melamine-formaldehyde condensation products (e.g. FR-A 943 411, "The Chemistry of Organic Filmformers", pages 235–240, John Wiley & Sons Inc., New York, 1974), epoxides capable of reacting with alcoholic hydroxyl groups, carboxylic acid anhydrides, phenoplasts, resols, urea resins, guanidine resins and mixtures thereof.

Preferred reaction components B) are the known, optionally blocked, lacquer polyisocyanates, i.e., modification products of monomeric diisocyanates that contain urethane groups, uretdione groups, allophanate groups and preferably biuret groups or isocyanurate groups. Examples of monomeric diisocyanates include 1,6-diisocyanatohexane, 1-isocyanato-3,3,5-trimethyl-5-isocyanato-methyl cyclohexane (isophorone diisocyanate), 1-methyl-2,4-diisocyanato-cyclohexane and mixtures thereof with up to 35% by weight, based on the total weight of the mixture, of 1-methyl-2,6-diisocyanatocyclohexane; 2,4-diisocyanatotoluene and mixtures thereof with up to 35% by weight, based on the total weight of the mixture, of 2,6-diisocyanatotoluene, and mixtures of the preceding or other diisocyanates. It is particularly preferred to use the "lacquer polyisocyanates" containing aliphatically and/or cycloaliphatically bound free isocyanate groups. Suitable blocking agents for preparing blocked polyisocyanates include ε-caprolactam, butanone oxime, phenol or phenol derivatives, secondary amines, optionally as a part of a heterocycle ring system and malonic acid alkyl esters.

The "lacquer polyisocyanates" containing urethane groups include those prepared by reacting 2,4 and optionally 2,6-diisocyanatotoluene or 1-methyl-2,4 and optionally 1-methyl-2,6-diisocyanatocyclohexane with subequivalent quantities of trimethylol propane, or mixtures thereof with low molecular weight diols, such as the isomeric propane or butane diols. Production of these lacquer polyisocyanates in substantially monomer-free form is described,e.g., in DE-PS 1,090,196.

The lacquer polyisocyanate containing biuret groups, which are particularly preferred in use according to the invention, are prepared from 1,6-diisocynatohexane as described, e.g., in EP-A 3,505, DE-A 1,101,394, U.S. Pat. No. 3,358,010 and U.S. Pat. No. 3,903,127.

The lacquer polyisocyanates containing isocyanurate groups, which are also particularly preferred, include the trimers or mixed trimers of the previously disclosed diisocyanates. Examples include polyisocyanates containing isocyanurate groups and prepared from diisocyanatotoluene according to GB-A 1,060,430, GB-A 1,506,373 or GB-A 1,485,564, mixed trimers of diisocyanatotoluene and 1,6-diisocyanatohexane prepared according to DE-A 1,644,809 or DE-A 3,144,672, and preferably aliphatic or aliphatic-cycloaliphatic trimers or mixed trimers prepared from 1,6-diisocyanatohexane and/or isophorone diisocyanate as described, e.g., in U.S. Pat. No. 4,324,879, U.S. Pat. No. 4,288,586, DE-A 3,100,262, DE-A 3,100,263, DE-A 3,033,860 or DE-A 3,144,672. The lacquer polyisocyanates used according to the invention generally have an isocyanate content of 5 to 25% by weight, an average NCO functionality of 2.0 to 5.0, preferably 2.8 to 4.0, and a residual content of monomeric diisocyanates of less than 2% by weight, preferably less than 0.5% by weight. Mixtures of the preceding lacquer polyisocyanates may be used according to the invention.

In the high solids two-component polyurethane coating compositions, the polyol component and the polyisocyanate component are used in proportions corresponding to an equivalent ratio of isocyanate groups to hydroxyl groups of 5:1 to 1:2, preferably 1.5:1 to 1:1.2. The two-component binders obtained by mixing the two components have only a limited pot-life of about 4 to 24 hours. They may be used either solvent-containing clear coating compositions or preferably, together with known additives. The optional additives can be added either to the mixture or to the individual components before mixing.

Examples of additives include solvents such as ethyl acetate, n-propyl acetate, isopropyl acetate, n-butyl acetate, n-hexyl acetate, n-heptyl acetate, 2-ethyl hexyl acetate, methoxypropyl acetate, methyl ethyl ketone, methyl isobutyl ketone, toluene, xylene, higher aromatic mixtures, white spirit and mixtures of these solvents.

Examples of other additives include plasticizers such as tricresyl phosphate, phthalic acid diesters and chloroparaffins; pigments and fillers such as titanium dioxide, barium sulphate, chalk or carbon black; catalysts such as N, N-dimethyl benzyl amine, N-methyl morpholine, zinc octoate, tin-II octoate or dibutyl tin dilaurate; levelling agents; thickeners; optional stabilizers such as substituted phenols; organofunctional silanes as primers or additives to improve resistance to light; and UV absorbers. Additives to improve resistance to light are, e.g., the sterically hindered amines described in DE-A 2,417,353(=U.S. Pat. No. 4,123,418 and U.S. Pat. No. 4,110,304) or DE-A 2,456,864 (=U.S. Pat. No. 3,993,655 and U.S. Pat. No. 4,221,701). Examples include bis(1,2,2,6,6-pentamethyl piperidyl-4) sebacate, bis (2,2,6,6-tetramethyl piperidyl-4) sebacate or N-butyl-(3,5-di-tert.-butyl-4-hydroxybenzyl) malonic acid-bis-(1,2,2,6,6-pentamethyl piperidyl-4) ester.

Moisture adhering to the fillers and pigments can be removed by previous drying or by the additional use of water-absorbing substances such as molecular-sieve zeolites.

The coatings prepared from coating compositions containing polyisocyanates, which are free from blocking agents, can be dried at room temperature without heating in order to obtain the optimum properties mentioned in the preamble. When the binders are used as repair lacquers, however, it is often advisable to raise the temperature to about 60° to 100° C., preferably 60° to 80° C. for a period of 20 to 60 minutes, to shorten the drying and hardening time.

When blocked polyisocyanates or the other previously-mentioned groups of products are used as cross-linking agents, the coatings have to be dried or cured at elevated temperatures of 100° to 240° C., preferably 120° to 220° C.

The resulting coatings are characterized by good hardness, good elasticity, excellent resistance to weather and chemicals, and high gloss. The hardening times, with regard both to physical drying and chemical cross-linking, are very short, with the result that the coated articles become resistant to solvents and chemicals very quickly and can be re-used. Therefore, the lacquers according to the invention are particularly suitable for coating large vehicles such as aircraft, railway carriages, tram cars and lorry superstructures.

Another preferred application is the repair of cars. The coatings may also be used for the prevention of corrosion, e.g., for coating bridges and power masts or for coating wood and furniture or as factory applied coatings for motor vehicles and industrial applications.

The coating compositions according to the invention may be applied by known methods, such as injection, pouring, immersion, painting, spraying or rolling. The coating compositions may be used both for primers, intermediate coats and, preferably, as top coats.

EXAMPLES

In the following examples are parts and percentages are by weight, unless otherwise indicated.

General specification for producing the graft copolymers A1 to A8 according to the invention and comparison copolymers V1 and V2

Part I was placed in a 5-liter high-grade steel pressure reactor with agitator, distillation equipment, receiver for monomer mixture and initiator, metering pumps, and automatic temperature control, and was heated to the polymerization temperature (190° C. in the examples). Next, part II (monomer mixture) was supplied in 1.5 hours and part III (initiator) was supplied through a separate inlet, beginning at the same time, in 1.75 hours. During this time the polymerization temperature was kept approximately constant (±2° C.). Agitation was continued for 30 minutes at the polymerization temperature, followed by cooling to room temperature at which time the solids content was determined. The graft copolymers contained 75±1% solids. During the reaction some of the α-olefin used was not incorporated into the polymer. When the solids content was ≦73%, the mixture was re-activated with 5% of the original amount of initiator at 150° C. for 30 minutes. When the content of solids was between 73 and 74%, the mixture was distilled to 75±1%. The graft copolymer was then filtered through a filter (Seitz Supra 5500). The compositions of parts I to III and the properties of the resulting polymers are set forth in Table I.

Adjustment of copolymer 2 in EP-A 638,591, serving as the comparison example V3

Copolymer 2 of EP-A 638,591 was adjusted exactly in accordance with the manufacturer's specification and the monomer composition. A substance having the following characteristic data was obtained:

Solids: 74.2%

Viscosity at 23° C.: 8450 mPa.s

Acid number, Lff/FH: 7.5/10.1 mg KOH/g

Hydroxyl number, Lff/FH: 109/147 mg KOH/g

Hazen color: 65 APHA

Manufacture of Example V3

In the same reactor described above 350 g Cardura E 10[1] (part I) were placed and heated under nitrogene to 185° C. Then a mixture of 171 g acrylic acid, 582 g HEMA, 740 g Isobernyl acrylate, 97 g Methyl methacrylate and 465 g Styrene was supplied in 6 hours as part II and 40 g Di.tert.-butyl peroxide were supplied through a separate inlet, beginning at the same time, in 6 hours as part III. Agitation was continued for 2 hours at 185° C. followed by cooling to 100° C. Then 875 g Butyl acetate were supplied in one portion followed by stirring for 30 minutes at 80° C. and then cooling to room temperature.

[1] Glycidyl ester of Versatic 10 acid, available from Shell Chemicals

TABLE 1

Composition and properties of graft copolymers A1 to A8 and comparison copolymers V1 and V2

| Composition | A1 | A2 | A3 | A4 | A5 | A6 | A7 | A8 | V1 | V2 |
|---|---|---|---|---|---|---|---|---|---|---|
| Part 1 | | | | | | | | | | |
| Butyl acetate | 15.00 | 15.00 | 15.00 | 15.00 | 15.00 | 15.00 | 15.00 | 15.00 | 15.00 | 15.00 |
| 1-decene | 9.40 | 9.40 | 9.40 | 9.40 | 9.40 | 9.40 | 9.40 | 9.40 | 9.40 | 9.40 |
| Vinyl ester[1)] | | | 8.39 | | | | | 4.94 | | |
| Part 2 | | | | | | | | | | |
| Styrene | 33.00 | 33.00 | 33.00 | 33.00 | 33.00 | 33.00 | 26.60 | 36.45 | 33.00 | 33.00 |
| HEMA | 23.00 | 23.00 | 23.00 | 23.00 | 23.00 | 23.00 | 23.00 | 23.00 | 23.00 | 23.00 |
| Butyl acrylate | 8.39 | 7.58 | | | | 4.20 | 1.49 | | 9.20 | |
| Butyl methacrylate | | | | | 8.39 | | | | | 9.20 |
| Isobornyl acrylate | | | | 8.39 | | | | | | |
| Methyl methacrylate | | | | | | | | 13.30 | | |
| Dicyclohexyl maleate | | | | | | | 4.19 | | | |
| Polybutadiene[2)] | 0.81 | 1.62 | 0.81 | 0.81 | 0.81 | 0.81 | 0.81 | 0.81 | | |
| Acrylic acid | 1.40 | 1.40 | 1.40 | 1.40 | 1.40 | 1.40 | 1.40 | 1.40 | 1.40 | 1.40 |
| Part 3 | | | | | | | | | | |
| Di.tert-butyl peroxide | 5.00 | 5.00 | 5.00 | | 5.00 | 5.00 | 5.00 | 5.00 | 5.00 | 5.00 |
| Di.tert-amyl peroxide | | | | 5.00 | | | | | | |
| Butyl acetate | 4.00 | 4.00 | 4.00 | 4.00 | 4.00 | 4.00 | 4.00 | 4.00 | 4.00 | 4.00 |
| Characteristic Data | | | | | | | | | | |
| Solids, % | 75.2 | 75.4 | 74.4 | 75.2 | 75.0 | 75.0 | 74.1 | 75.0 | 74.6 | 74.7 |
| Viscosity, MPa · s (23° C.) | 5000 | 6150 | 5880 | 6180 | 4080 | 7850 | 4360 | 5880 | 4500 | 3820 |
| Acid number Lff. = solution mg KOH/g | 13.3 | 13.4 | 12.7 | 11.3 | 13.5 | 13.1 | 13.0 | 12.6 | 13.4 | 13.2 |
| OH number, Lff. mg KOH/g | 98 | 99 | 96 | 99 | 96 | 96 | 97 | 96 | 98 | 98 |
| OH content FH = solid % | 4.0 | 4.0 | 3.9 | 4.0 | 3.9 | 3.9 | 3.9 | 3.9 | 4.0 | 4.0 |
| Color, APHA | 20 | 30 | 75 | 0 | 20 | 5 | 60 | 25 | 10 | 20 |
| Appearance | Clear | Clear | Clear | Clear | Clear | Clear | Clear | Clear | Clear | Clear |

[1)]VeoVa 9 resin, available from Shell
[2)]Lithene AL, available from Chemetall, Frankfurt, number average molecular weight = 1000 micro structure:
1,2-vinyl double bonds 40–50%
1,4-trans double bonds 15–25%
1,4-cis double bonds 10–20%
cyclic part 15–20%

Examples of Use

This examples describes the production of usable coating compositions from polyacrylate polyols A1 to A8 and V1 to V3, the production of coatings and testing of these coatings.

In order to judge the general lacquer properties, clear lacquers were prepared by mixing polyols A1 to A8 and V1 to V3 with a lacquer polyisocyanate at an NCO/OH equivalent ratio of about 1:1. The lacquer polyisocyanate was ®Desmodur N 3390, which is available from Bayer AG and is a polyisocyanate containing isocyanurate groups, is prepared from 1,6-diisocyanatohexane, is present as a 90% solution in a 1:1 butyl acetate/solvent naphtha mixture, has an NCO content of the solution of about 19.4% by weight and has a free 1,6-diisocyanatohexane content of <0.5%, based on solution. The resin components were blended with the following additives, in which the amounts are based on resin solids, i.e., the sum of solid polyol and polyisocyanate components:

| Additive | % by weight |
|---|---|
| Dabco 33 LV (a polyurethane catalyst available from Air Products, 10% in butyl acetate | 0.3 |
| BYK 331 (a levelling agent, available from BYK-Chemie, 50% in butyl acetate) | 0.3 |
| Tinuvin 1130 (a UV absorber available from Ciba-Geigy, Basle, 50% in xylene) | 2.0 |
| Tinuvin 292 (a light stabilizer available from Ciba-Geigy, Basle, 50% in xylene | 1.0 |

The solvent was a 1:1:1 mixture of methoxypropyl acetate, xylene and n-butyl acetate. The coating compositions contained about 56 wt. % binder, about 2 wt. % of additives and about 42 wt. % of solvent.

The running-out time (DIN 53 211, 4-mm nozzle) was about 20 s, which is a suitable application viscosity. The coating compositions had a VOC (volatile organic compounds) content of 3.5 lbs/gal.

The coating compositions were spread onto glass plates, dried both at room temperature and at 60° C. for 30 minutes, at which time the speed of drying (DIN 53 150) was determined, and then stored for 7 days at room temperature. The thickness of the dry film was about 40 to 50 μm.

The König hardness (DIN 53 157), the 60° Gardner gloss and the solubility in supergrade petrol was tested after storage for 1, 2, 3 and 4 days at room temperature. The cupping index was measured on suitably coated test metal sheets.

The resistance to yellowing after irradiation with shortwave UV light in the QUV test (QUV-accelerated weathering tester, ASTM G 53-77) was also tested. Clear coating compositions based on polyols A1 to A8 and V1 to V3 were applied to aluminum sheets (68 mm×150 mm) which had previously been primed and coated with white base lacquer. After application and drying (30 minutes at 60° C.) the coatings were stored at room temperature for 7 days and then tested in the QUV apparatus (made by Q-Panel Company). Cycles of 4 hours in intense non-filtered UV light at a wavelength ranging from about 280 to 370 nm (maximum at 313 nm) were followed by 4 hours in the dark, for a total of 1000 hours. After the test-piece had been washed, the total color difference DE (compared with the non-weathered plate) was measured in a colorimeter, as an indication of the amount of yellowing.

The test results for the coatings based on copolymers A1 to A8 and V1 to V3 are set forth in Table 2.

TABLE 2

Test results for coating compositions based on polyols A1 to A8 and comparison polyols V1 to V3

|  | A1 | A2 | A3 | A4 | A5 | A6 | A7 | A8 | V1 | V2 | V3 |
|---|---|---|---|---|---|---|---|---|---|---|---|
| Polyol used for coating Drying[1] at RT |  |  |  |  |  |  |  |  |  |  |  |
| T1 (minutes) | 120 | 105 | 75 | 90 | 120 | 90 | 105 | 75 | 150 | 150 | 120 |
| T3 (hours) | 7.5 | 7.0 | 6.0 | 6.5 | 7.5 | 6.5 | 7.0 | 6.0 | 9,0 | 9,0 | 7.5 |
| Pendulum hardness |  |  |  |  |  |  |  |  |  |  |  |
| 23° C. + 7d RT (s) | 120 | 123 | 167 | 135 | 118 | 138 | 126 | 167 | 124 | 90 | 155 |
| 30/60° C. + 7d RT (s) | 172 | 170 | 196 | 182 | 172 | 185 | 170 | 200 | 174 | 130 | 204 |
| Resistance to supergrade petrol[2] |  |  |  |  |  |  |  |  |  |  |  |
| 23° C. + 1d RT, 1 min/5 min | 0/1 | 0/1 | 0/0 | 0/1 | 0/1 | 0/1 | 0/1 | 0/0 | 0–1/2 | 0–1/2 | 2/4 |
| 23° C. + 2d RT, 1 min/5 min | 0/0 | 0/0 |  | 0/0 | 0/0 | 0/0 | 0/0 |  | 0/1 | 0/1 | 1/2 |
| 23° C. + 3d RT, 1 min/5 min |  |  |  |  |  |  |  |  | 0/0 | 0/0 | 0/1 |
| 23° C. + 4d RT, 1 min/5 min |  |  |  |  |  |  |  |  |  |  | 0/0 |
| Polyol-based lacquer |  |  |  |  |  |  |  |  |  |  |  |
| Cupping index (mm) | 11.0 | 11.0 | 10.5 | 11.0 | 11.0 | 10.5 | 11.0 | 10.5 | 11.0 | 11.0 | 10.5 |
| QUV test (DE) 250 h/1000 h | 4.4/ 7.3 | 4.6/ 7.7 | 4.1/ 6.3 | 4.3/ 6.8 | 4.3/ 7.1 | 4.2/ 6.9 | 3.8/ 5.9 | 4.3/ 6.8 | 3.2/ 6.8 | 4.3/ 7.0 | 4.0/ 6.4 |
| Gloss[3] (<60°) Zero hours/1000 h | 100/ 98 | 100/ 98 | 98/ 94 | 99/ 98 | 100/ 97 | 99/ 96 | 100/ 98 | 97/ 93 | 98/ 94 | 99/ 94 | 96/ 93 |

[1]T1 - sand drying, T3 - 1 drying (DIN 53 150)
[2]0 = best value (no effect), 5 = worst value (coating completely dissolved at the place under stress)
[3]Before and after the QUV test Discussion of Results The two-component polyurethane clear coating compositions based on polyols A1 to A8, despite the high content of solids, dried rapidly at room temperature after application and were resistant to the action of supergrade petrol after only 1 or 2 days. The gloss, elasticity and film hardness are at a high level when compared to industry standards. To the contrary the coating compositions based on polyols V1 and V2, which are described in EP 225,809 (U.S. Pat. Nos. 4,855,369 and 4,985,517) do not contain polybutadiene, take longer to dry and are less resistant to supergrade petrol. The coating prepared from comparison polyol V3 dried the quickest of the comparison coatings, but its resistance to supergrade petrol was the poorest, i.e., it was poor after one day, better after two or three days and not adequate until four days.

The test results clearly demonstrate that high solids, two-component polyurethane clear coating compositions based on polyols A1 to A8 according to the invention, despite of their high solids content, dry very quickly and are also very resistant to petrol. Therefore, articles, preferably cars, coated with these coating compositions can be used for their intended purpose after a very short time.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder composition comprising

A) 40 to 95 parts by weight of OH-functional graft copolymer resins which are prepared by copolymerizing
   a) 0.1 to 10 parts by weight of at least one optionally functional polybutadiene having a number average molecular weight of 500 to 10,000 and having at least 20% by weight of side-chain 1,2-vinyl double bonds,
   b) 5 to 30 parts by weight of at least one aliphatic α-olefin having 8 to 16 carbon atoms,
   c) 10 to 70 parts by weight of at least one unsaturated aromatic monomer,
   d) 5 to 60 parts by weight of at least one hydroxyalkyl ester of (meth)acrylic acid having 2 to 4 carbon atoms in the hydroxyalkyl radical and a primary hydroxyl group,
   e) 0 to 50 parts by weight of at least one (cyclo) aliphatic ester of acrylic and/or methacrylic acid having 1 to 12 carbon atoms in the alcohol component,
   f) 0.1 to 10 parts by weight of at least one α,β-monoolefinically unsaturated mono- or dicarboxylic acid having 3 to 7 carbon atoms and/or at least one maleic acid or fumaric acid semiester having 1 to 14 carbon atoms in the alcohol radical,
   g) 0 to 30 parts by weight of other copolymerizable olefinically unsaturated compounds and B) 5 to 60 parts by weight of a polyfunctional crosslinking resin selected from aminoplast resins, urea resins, guanidine resins, phenolic resins, resols and optionally blocked polyisocyanates, wherein the sum of the parts by weight of components A) and B) add up to 100, based on the weight of components A) and B), and the sum of the parts by weight of components a) to g) add up to 100.

2. The binder composition of claim 1 wherein the OH-functional graft copolymer resins are prepared by copolymerizing 0.3 to 7.5 parts by weight of one or more optionally functional polybutadienes having a number average molecular weight of 500 to 5000 and having at least 30% by weight of side-chain 1,2-vinyl double bonds, b) 5 to 25 parts by weight of at least one α-olefin having 8 to 12 carbon atoms, c) 15 to 65 parts by weight of styrene, d) 7.5 to 55 parts by weight of hydroxyethyl acrylate, hydroxyethyl methacrylate, butanediol-1,4-monoacrylate and mixtures thereof, e) 0 to 45 parts by weight of at least one (cyclo)aliphatic ester of acrylic and/or methacrylic acid having 1 to 10 carbon atoms in the (cyclo)alkyl component, f) 0.3 to 8 parts by weight of acrylic acid, methacrylic acid, maleic acid or fumaric acid semiesters having 1 to 8 carbon atoms in the alcohol component or mixtures thereof and g) 1 to 25 parts by weight of acrylonitrile, methacrylonitrile, hydroxypropyl-(meth)acrylate (up to 10% by weight), vinyl esters of aliphatic, optionally branched monocarboxylic acids having 1 to 10 carbon atoms in the acid radical, or di(cyclo)alkyl esters of maleic and/or fumaric acid having 1 to 8 carbon atoms in the alcohol radical, or mixtures thereof.

3. The binder composition of claim 1 wherein the OH-functional graft copolymer resins are prepared by copolymerizing a) 0.5 to 5 parts by weight of one or more optionally functional polybutadienes having a number average molecular weight of 500 to 3000 and having at least 40% by weight of side-chain 1,2-vinyl double bonds, b) 5 to 20 parts by weight of 1-octene, 1-decene or mixtures thereof, c) 20 to 65 parts by weight of styrene, d) 10 to 50 parts by weight of hydroxyethyl acrylate, hydroxyethyl methacrylate or mixtures thereof, e) 0 to 35 parts by weight of ethyl acrylate, butyl acrylate, 2-ethyl hexyl acrylate, isobornyl acrylate, methyl methacrylate, ethyl methacrylate, butyl methacrylate, 2-ethyl hexyl methacrylate, cylcohexyl methacrylate, isobornyl methacrylate or mixtures thereof, f) 0.5 to 5 parts by weight of acrylic acid, methacrylic acid or mixtures thereof and g) 3 to 20 parts by weight of vinyl esters of aliphatic, optionally branched monocarboxylic acids having 3 to 9 carbon atoms in the acid radical, di(cyclo)-alkyl esters of maleic or fumaric acid having 1 to 8 carbon atoms in the alcohol radical or mixtures thereof.

4. The binder composition of claim 1 wherein polyfunctional cross-linking resin B) comprises an aminoplastic resin.

5. The binder composition of claim 2 wherein polyfunctional cross-linking resin B) comprises an aminoplastic resin.

6. The binder composition of claim 3 wherein polyfunctional cross-linking resin B) comprises an aminoplastic resin.

7. The binder composition of claim 1 wherein polyfunctional cross-linking resin B) comprises a phenolic resin, a resol or mixtures thereof.

8. The binder composition of claim 2 wherein polyfunctional cross-linking resin B) comprises a phenolic resin, a resol or mixtures thereof.

9. The binder composition of claim 3 wherein polyfunctional cross-linking resin B) comprises a phenolic resin, a resol or mixtures thereof.

10. The binder composition of claim 1 wherein polyfunctional cross-linking resin B) comprises a polyisocyanate.

11. The binder composition of claim 2 wherein polyfunctional cross-linking resin B) comprises a polyisocyanate.

12. The binder composition of claim 3 wherein polyfunctional cross-linking resin B) comprises a polyisocyanate.

13. A coated substrate coated with the binder composition of claim 1.

* * * * *